United States Patent [19]

Wyatt

[11] 4,190,534
[45] Feb. 26, 1980

[54] WASTE WATER FILTRATION AND SLUDGE REMOVAL SYSTEM

[75] Inventor: Everette L. Wyatt, Carthage, Mo.

[73] Assignee: Armco Steel Corporation, Middletown, Ohio

[21] Appl. No.: 903,781

[22] Filed: May 8, 1978

[51] Int. Cl.² ............................................. B01D 23/24
[52] U.S. Cl. ..................................... 210/80; 210/271; 210/290
[58] Field of Search ................. 210/80, 263, 271–273, 210/290, 413–415, 500 R, 503

[56] References Cited

U.S. PATENT DOCUMENTS

| | | | |
|---|---|---|---|
| 2,207,136 | 7/1940 | Veatch | 210/263 |
| 2,396,769 | 3/1946 | Asch | 210/271 |
| 3,771,655 | 11/1973 | Hudson | 210/108 |
| 4,075,109 | 2/1978 | Blalock | 210/527 |
| 4,081,365 | 3/1978 | White et al. | 210/80 |

OTHER PUBLICATIONS

Montgomery, Gail E., "The Effect of Chemical Sludge Physical Properties on Sand Bed Dewatering and Drying", Thesis document presented at the University of Missouri, Dec. 1973.

Primary Examiner—Charles N. Hart
Assistant Examiner—Ivars Cintins
Attorney, Agent, or Firm—Melville, Strasser, Foster & Hoffman

[57] ABSTRACT

A waste water filtration and sludge removal system for filtering and removing sludge materials suspended in water resulting from steel pickling and cleaning operations and the like. The system includes a trough-like filtering tank having weep holes along the lower edge draining into an inclined channel for capturing filtered water for reuse, and also includes a multiple layer filter bed containing an upper layer of fine jagged surfaced particles for capturing filtered sludge. The sludge layer deposited on the surface of the upper filter layer is periodically moved by means of an adjustable screed blade toward an elevated discharge station for removal from the tank without significantly disturbing the filter bed. The screed blade may be automatically raised out of contact with the sludge layer when operated in the reverse direction.

13 Claims, 7 Drawing Figures

WASTE WATER FILTRATION AND SLUDGE REMOVAL SYSTEM

BACKGROUND OF THE INVENTION

1. Field of the Invention

The present invention relates generally to filters for simultaneous removal of suspended solids and solids dewatering, and more particularly to a filter having a particular filter bed construction and an automatic scraper for removing filtered sludge from the filter bed.

2. Description of the Prior Art

Steel processing and treatment facilities produce large quantities of by-products, some of which may present serious disposal problems, while others can be recycled in various ways. One particular steel treatment process involves the fabrication of carbon steel rod into spring wire. In this process, the rod is first cleaned by sulfuric acid prior to being drawn to the proper size. Depending on the initial and final gage, some of the drawn wire may be heat treated, recleaned and drawn again to the final dimensions.

In a typical treatment sequence, coils of wire are submerged in a tank containing sulfuric acid for sufficient time to remove scale and dirt. Following the sulfuric acid treatment, the wire coils are subjected to a high pressure water rinse and submerged in a tank containing water to insure complete removal of the acid from the steel rod. In some operations, it has been found desirable to use hydrochloric acid rather than sulfuric acid to remove scale and dirt from the steel rod. In either event, the resulting rinse water contains substantial quantities of dissolved iron.

When it is determined that the acid content of the rinse water has reached a particular concentration, the waste water containing sulfuric or hydrochloric acid is pumped to a neutralization tank and neutralized by sodium hydroxide, lime or the like, which reacts with the acid to form calcium sulfate, sodium sulfate, sodium chloride, calcium chloride, ferrous hydrate, ferric hydrate, magnetite, or other types of dissolved materials.

In general, disposal of this waste water containing sludge has met with some difficulty. For example, the high water content of the sludge, due in part to the ferrous and ferric hydrate, makes the sludge extremely difficult to handle and transport. Furthermore, the water content of the sludge has generally not been recovered by prior art processes, and hence is not available for reuse.

Prior art workers have suggested utilizing settling or clarifier tanks where the sludge settles to the bottom of the tank and is subsequently pumped to a vacuum filter. This method has not been entirely satisfactory because the consentrated sludge particles generally are not sufficiently agglomerated to be effectively removed by the vacuum filter.

It has also been suggested to utilize filter beds with permeable filter material to separate the sludge from the waste water. However, known types of permeable filter beds are inadequate to handle the types of sludge experienced with these steel treatment processes. For example, in filter beds utilizing small smooth sand particles, the filter becomes compacted rather easily and long times are required for draining the water from the sludge. If the smooth sand particle size is increased to increase the rate of water flow, the small sludge particles soon fill the voids between the sand particles and plugging results. Thus the filter bed must be renewed periodically by either removing a significant portion of the filter material or by backwashing the filter bed to open up the filter material. In either event, the sludge resulting from the operation still contains a significant water content, which is subject to the same disposal problem discussed hereinabove.

SUMMARY OF THE INVENTION

The present invention describes a waste water filtration and sludge removal system wherein the waste water produced by the types of steel treatment processes described hereinabove can be filtered to produce reusable wash water and an iron sludge having an acceptably low water content for convenient handling and possibly for use as a soil conditioner, etc.

The system of the present invention comprises a trough-like filtering tank containing a multiple layer filter bed for separating the sludge from the waste water. The upper layer of the filter bed is composed of fine jagged surfaced particles which resist packing while maintaining a satisfactory degree of filtering and water flow. The jagged surfaced particles are supported by a layer of coarse aggregate material which directs water drained from the sludge to a plurality of spaced weep holes extending through the lower portion of the tank walls. The water draining from the weep holes may be collected in a conduit or channel for routing to a storage tank for subsequent reuse or disposal.

The sludge layer which collects on the upper filter layer is removed periodically by means of a reciprocating screed blade which travels longitudinally along the interior of the filter tank to move sludge toward a discharge station. The lower edge of the screed blade is positioned so as to just contact the upper surface of the filter bed to insure that all of the sludge material is removed with minimal disturbance of the filter bed material. The portion of the filter tank adjacent the discharge station is inclined upwardly to prevent waste water from flowing out of the tank during the filtering process. The discharge station is so arranged as to include a bay designed to accept a receptacle which may be positioned beneath the discharge station to receive the sludge discharged from the tank. The sludge may then be conveniently transported from the filter tank.

In order to insure that the screed blade does not disturb the sludge layer during reverse movement away from the discharge station, the blade may be mounted to pivot toward the discharge station during reverse travel such that the lower edge of the blade rides on the upper surface of the sludge layer. In a preferred embodiment, the blade is automatically raised by reverse travel of the screed blade to position the blade out of contact with the sludge layer. The blade is automatically returned to the lowered position when the blade is moved in a forward direction to move sludge toward the discharge station.

The waste water filtration and sludge removal system of the present invention thus produces optimal filtering of the waste water together with means for removing the captured sludge with minimal disturbance of the underlying filter bed. In addition, the sludge is easily removed from the filter bed without the necessity of backwashing the filter material. Other features of the invention will become apparent from the descriptions set forth hereinbelow.

BRIEF DESCRIPTION OF THE DRAWINGS

FIG. 7 is a fragmentary cross-sectional view taken along section line 7—7 of FIG. 5 illustrating the latch and latch arm detail.

DESCRIPTION OF THE PREFERRED EMBODIMENTS

As described hereinabove, rinse water containing acid from the steel rod rinse operation is pumped or otherwise conducted to a neutralizing mixing tank, shown diagramatically at 1 in FIG. 1 and FIG. 2. In addition, some of the spent pickle liquor from the wire coil cleaning operation may also be pumped to the neutralization tank, as required. In a specific embodiment, the neutralization mixing tank 1 will accumulate 12,000–17,000 gallons of waste water and/or spent pickle liquor, to which a lime slurry is added until the mixture reaches ph8–8.5, whereupon the various iron constituents will precipitate out of the mixture. To aid in the mixing process, a motor, shown diagramatically at 2, driving mixing or agitating blades 3 may be used as required. When the mixture has reached the proper ph level, indicating that the slurry is substantially neutralized, a valve (not shown) may be opened to permit the neutralized waste water to flow by gravity through either of discharge pipes 4 to trough-like filter tank 5. Although for purposes of an exemplary showing, the operation and construction of a single filtering tank 5 will be described, it will be understood that a plurality of such tanks may be utilized as shown in FIG. 2. In addition, if neutralization tank 1 cannot be constructed at a higher elevation than filtering tank 5, the neutralized waste water may be pumped to tank 5 through discharge pipe 4 as is well understood in the art. A weir may be positioned within tank 5 near the charging end or station of the tank to prevent inflowing neutralized waste water from disturbing the filter bed or filtered sludge deposited on the filter bed as will be described in more detail hereinafter. Neutralized waste water flowing over the top of weir 6 flows into the main body of tank 5 and is generally evenly distributed between weir 6 and portion 7 of tank 5.

Figure 1:
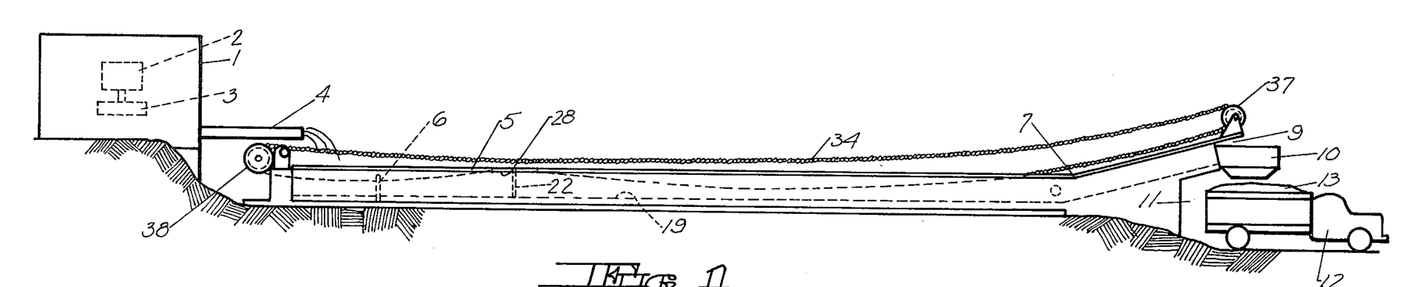
FIG. 1 is a side elevation schematic view of the waste water filtration and sludge removal system of the present invention.
Figure 2:
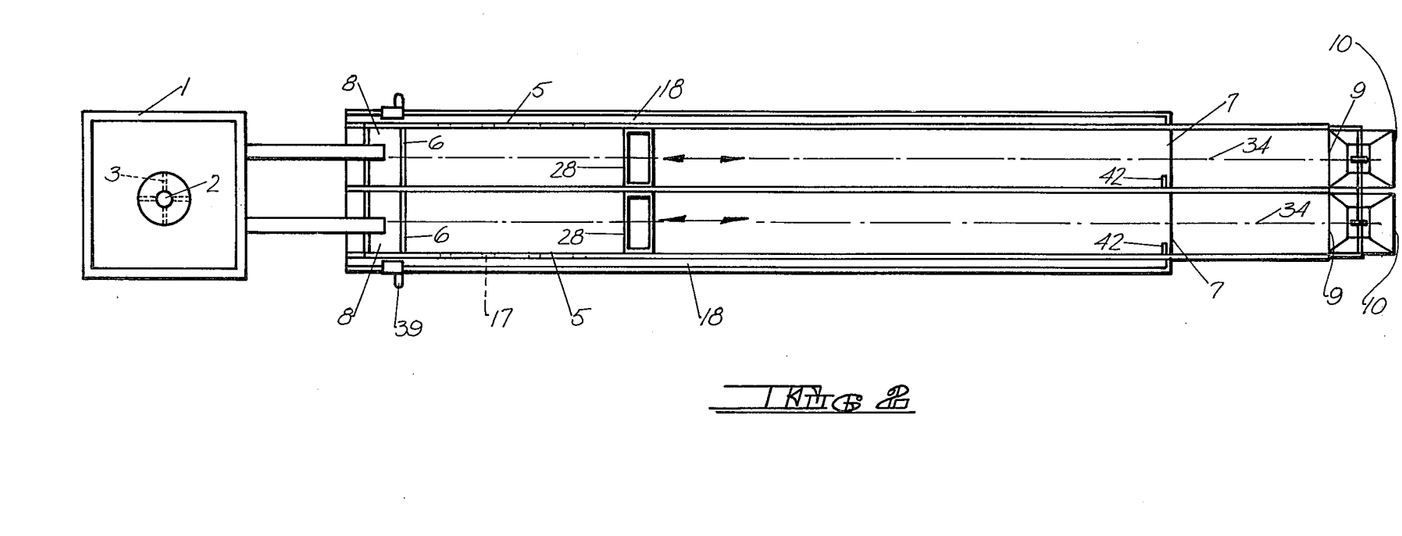
FIG. 2 is a top plan view diagramatically illustrating the filtration tanks of the present invention.

As best shown in FIG. 1, the portion of tank 5 beyond location 7 is inclined upwardly, terminating in an opening defining a discharge station 9. This incline insures that the bottom of tank 5 located at discharge station 9 will be located above the maximum water depth elevation of the filtering tank. Constructing the floor of tank 5 adjacent discharge station 9 at a higher elevation then the level of water containing sludge introduced into tank 5 thus prevents overflow from discharge station 9.

Discharge station 9 may also be provided with a hopper 10 or other receptacle positioned beneath the discharge station 9 to receive the sludge discharged from tank 5 as will be described hereinafter. As illustrated in FIG. 1, the portion of tank 5 adjacent discharge station 9 may be undercut as at 11 to provide a bay to permit a vehicle 12 or the like to be positioned beneath hopper 10 for receiving sludge 13 discharged from tank 5. Sludge 13 may then be easily hauled to an appropriate location.

Figure 3:
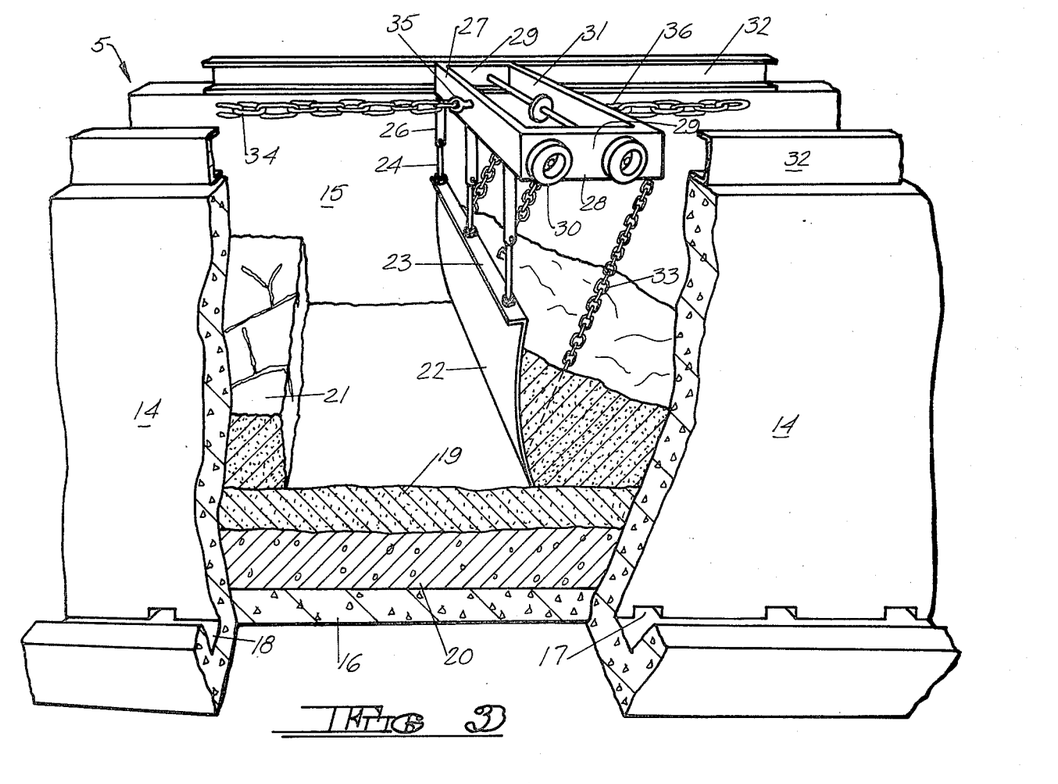
FIG. 3 is a fragmentary perspective cutaway view of the filtration and sludge removal system of the present invention.

As is best shown in FIG. 3, the trough-like filtering tank, shown generally at 5, comprises a pair of spaced upstanding longitudinal walls 14 and 15 supported by a substantially planar imperforate floor 16, and may be constructed of any suitable material such as concrete and the like. Either or both of walls 14 and 15 may contain a plurality of spaced apertures or weep holes, one of which is shown at 17, extending through the wall adjacent floor 16 for draining filtered water from the tank. Weep holes 17 communicate with a channel-like conduit 18 positioned along the lower edge of either or both of walls 14 and 15 to conduct filtered water away from filtering tank 5. To facilitate the flow of water, channel 18 may be inclined slightly so that the filtered water flows toward charging station 8 or inclined such that water flows in the direction of discharge station 9. In either event, the filtered water may be returned to the steel processing operation or disposed of, as desired. It will also be understood that the filtered water may be removed from channel 18 by other means, such as pumping and the like. Furthermore, it will be observed that by locating weep holes 17 along the exterior of either or both of walls 14, the weep holes are easily accessible for removing debris or filter material which may block the weep hole and prevent adequate drainage of filtered water.

Tank 5 is inclined slightly so that floor 16 slopes toward weep holes 17 and channel-like conduit 18. This arrangement permits the filtered water to easily flow toward weep holes 17 and be discharged therefrom into channel 18.

Filtering tank 5 also contains a permeable filter bed overlying floor 16 for filtering the sludge from the waste water. The permeable filter bed comprises an upper layer 19 of fine jagged surfaced particles overlying a lower layer 20 of coarse particulate material. It has been found that particles, such as flint quarry tailings, having jagged surfaces prevent the close packing which generally occurs with smooth surfaced sand, resulting in a filter which allows the water to quickly penetrate while preventing the sludge from penetrating. This arrangement prevents plugging of the sand which in prior art filters have required removing part of the filter layer or backwashing of the filter to remove the plugging sludge.

It will be understood that the size of the particles comprising filter layer 19 will depend on the particular application. In general, it has been found that particle sizes in the range 200 mesh–¼ inch produced satisfactory results. Again, depending upon the particular application involved, the particles may be of substantially uniform size, or may have a specific size graduation within the aforementioned range. In particular, for the application described hereinabove, it has been found that satisfactory results are obtained with particles having a size graduation such that one hundred percent (100%) of the particles will pass a ¼ inch screen, ninety percent (90%) of the particles will pass a 10 mesh screen, five percent (5%) of the particles will pass a 50 mesh screen, and the balance of the particles will be retained on a 200 mesh screen.

Filter layer 20 may be composed of any type of coarse particulate material, such as limestone, etc. which is capable of supporting the fine particles of layer 19 and permitting the filtered water to quickly penetrate to weep holes 17.

As best shown in FIG. 3, when the waste water introduced from neutralization tank 1 has penetrated through the permeable filter layer, a cake-like layer 21 of sludge is deposited on the upper surface of filter layer 19. Whereas in prior art designs, sludge layer 21 has been removed by concurrently removing a significant portion of upper filter layer 19, or by backwashing the entire permeable filter bed, the present invention mechanically removes sludge layer 21 without significantly disturbing upper filter layer 19 or introducing additional liquid content into the sludge layer.

Figure 5:
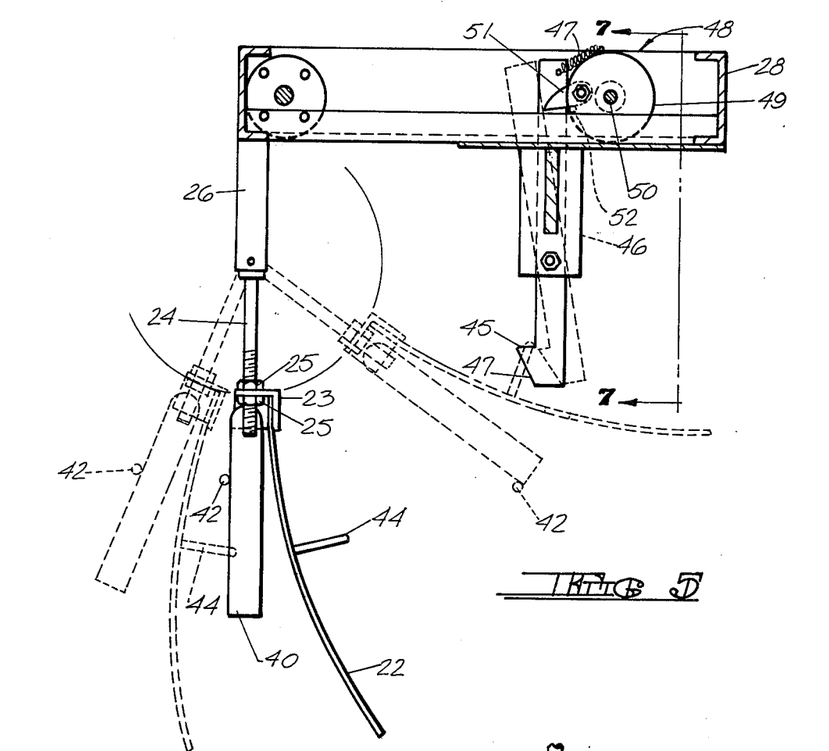
FIG. 5 is a cross-sectional view taken along section line 5—5 of FIG. 4 illustrating the screed blade in the raised and lowered positions.

The mechanical scraping operation is performed by screed blade 22 which is positioned vertically within filtering tank 5 such that the lower edge of blade 22 just contacts the upper surface of upper filter layer 19. As illustrated in FIG. 3 and FIG. 5, screed blade 22 is slightly convex to insure that the sludge layer 21 is peeled from the upper surface of filter layer 19, rather than being pushed along, which may result in unnecessary amounts of filter layer 19 material being dragged along with the sludge.

The upper edge of screed blade 22 is formed in a substantially horizontal lip 23 which is suspended from 3 spaced threaded rods, one of which is shown at 24. Nuts 25 positioned on either side of lip 23 permit screed blade 22 to be adjusted upwardly or downwardly, to insure that the lower edge of screed blade 22 is properly positioned with respect to sludge layer 21 and upper filter layer 19. The upper end of each rod 24 is pivotally attached to the lower end of a downwardly extending arm, one of which is shown at 26, thereby permitting blade 22 to pivot in directions parallel to the longitudinal axis of filtering tank 5.

Figure 4:
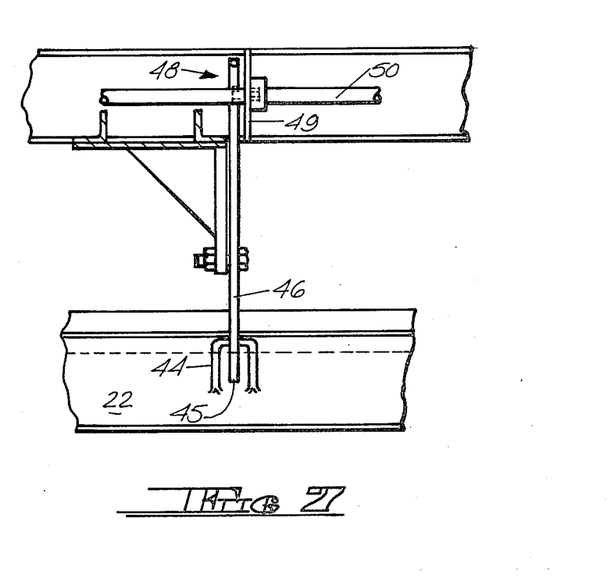
FIG. 4 is a fragmentary top plan view of the screed blade and carriage assembly.

The upper ends of depending arms 26 are rigidly attached to transverse frame member 27 of box-like carriage frame, designated generally at 28 in FIG. 4. The outermost ends of transverse carriage frame member 27 terminate in forwardly extending side frame members 29, each containing a pair of spaced wheels, one of which is shown at 30. The forwardmost ends of side frames 29 are connected by a transverse frame member 31 parallel to and spaced from transverse frame number 27, thereby completing the box-like frame of carriage 28.

As shown in FIG. 3, a U-shaped channel-like guide rail 32 is positioned along the uppermost edge of each wall of filtering tank 5 to guide and support carriage 28 by means of rotatable wheels 30. Guide rails 32 extend along the entire length of tank 5, including the upwardly inclined portion of tank 5 adjacent discharge station 9. Backward pivotal rotation of screed blade 22 is prevented by 3 spaced cable-like chains, one of which is illustrated at 33, extending between the lower edge of screed blade 22 and forwardmost transverse frame member 31. It will be observed that the vertical position of screed blade 22 may also be adjusted by adding or removing links from chain 22, or by providing a turnbuckle or other adjusting device, not shown.

Carriage 28 may be driven in a forward direction toward discharge station 9, and in a reverse direction toward charging station 8, by means of an endless drive chain 34, one end of which is affixed to rearmost transverse frame member 27, as at 35, while the other end is affixed to the forwardmost transverse frame member 31, as at 36. Endless chain 34 is looped around a toothed sprocket wheel 37 rotatably mounted along the central axis of tank 5 adjacent discharge station 9, and by a similar toothed wheel 38 rotatably mounted along the central axis of tank 5 near charging station 8. Wheel 37 rotates freely, while wheel 38 is driven by a reversible electric motor 39, or the like, as is well understood in the art. Thus when motor 39 is rotating in the forward direction, carriage 28 will be driven in a foward direction toward discharge station 9 such that screed blade 22 peels off sludge layer 21 and moves the sludge toward the discharge station. When motor 39 is reversed, carriage 28 will be pulled in the reverse direction away from discharge station 9 to return screed blade 22 for another sludge moving operation. While for purposes of an exemplary showing, motor 39 comprising the driving means for carriage 28 has been illustrated and described as located separate and apart from carriage 28, it will be understood that any suitable driving means could be mounted on carriage 28 and utilize friction drive wheels against rail 32, including utilizing one of rails 32 as a "hot rail" to supply electrical energy to the drive means. Such an arrangement is illustrated in U.S. Pat. No. 4,075,109 issued Feb. 21, 1978, to Eugene D. Blalock. It will also be understood that stops or automatic reversing switches may be located at the charging and discharging stations to limit travel of carriage 28 along the length of filter tank 5. Finally, wire rope, cable or the like could be substituted for drive chain 34 to transfer motive power from a remotely located power source to carriage 28, again as is well understood in the art.

The mounting construction of screed blade 22 as illustrated in FIG. 3 permits blade 22 to pivot toward discharge station 9 when carriage 28 is operated in the reverse direction, so that the screed blade slides backwardly along the upper surface of upper filter layer 19 and sludge layer 21 to produce minimal distrubance of the filter material and the sludge. However, inasmuch as the water content of certain types of sludge deposits may be rather large, resulting in very low bearing strength, it has proven desirable to automatically raise screed blade 22 out of contact with sludge layer 21 during the reverse movement of carriage 28 to prevent contact with the sludge. The blade raising and lowering mechanism for accomplishing this result is illustrated in FIG. 4–FIG. 7.

Figure 6:
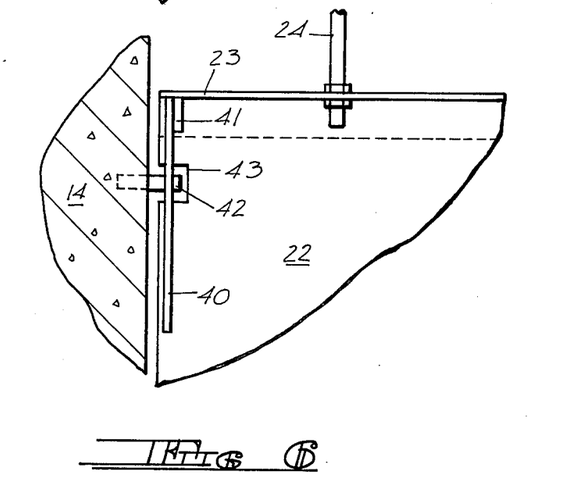
FIG. 6 is a fragmentary front elevation view of the screed blade showing the trip pin and elevating arm detail.

As is best shown in FIG. 5 and FIG. 6, a downwardly depending elevating arm 40 is pivotally attached at its upper end to a flange depending downwardly from the outermost edge of lip 23 of screed blade 22. Elevating arm 40 is positioned on the side of screed blade 22 facing charging station 8, so that while elevating arm 40 is free to rotate in a direction away from screed blade 22 (i.e., toward charging station 8), attempted rotation of elevating arm 40 toward screed blade 22 (i.e., toward discharging station 9), results in the forwardmost edge of elevating arm 40 being urged against the rearwardmost surface of screed blade 22.

As shown in FIG. 2 and FIG. 6, a rod-like trip pin 42 extends inwardly from the inner surface of wall 14 of tank 5 at a vertical position slightly below the pivotal connection of elevating arm 40 to downwardly depending flange 41. Screed blade 22 may also be provided with a notch 43 in its outermost edge to prevent interference between pin 42 and blade 22. It is preferred that pin 42 be positioned near the start 7 of the inclined portion of filter 5, as shown in FIG. 2. Thus when screed blade 22 is moving in the forward direction toward discharge station 9, elevating arm 40 will pivot rearwardly, riding harmlessly over the outer surface of trip pin 42. However, when the direction of travel of screed blade 22 is reversed, so that the blade is moving in the reverse direction toward charging station 8, trip pin 42 will abut elevating arm 40 urging arm 40 and screed blade 22 pivotally away from pin 42 to the raised position shown in dashed lines in FIG. 5, so that the lower edge of screed blade 22 is out of contact with sludge layer 21 and upper filter layer 19. It will also be understood that a rod-like trip pin 42 may be provided to extend inwardly from both walls 14 of tank 5 so as to contact a pair of elevating arms 40 positioned on opposite ends of screed blade 22.

To insure that screed blade 22 remains in the raised position during the entire length of reverse travel of carriage 28, a U-shaped hook-like latch hanger 44 extends outwardly from the forward surface of screed blade 22. Latch hanger 44 is adapted to engage the latch end 45 of a downwardly depending latch arm 46 pivotally attached to carriage 28. The uppermost end of latch arm 46 is biased by means of spring 47 or the like to urge latch end 45 toward screed blade 22, so that when the blade is moved to the raised position as described hereinabove, the outermost edge of latch hanger 45 slides upwardly along the inclined surface 47 of latch end 45 and is engaged by latch end 45 to hold screed blade 22 in the raised position as long as carriage 28 is moving in the reverse direction. When carriage 28 begins movement in the forward direction to begin a new scraping operation, the upper end of latch arm 46 is pressed toward screed blade 22, causing the latch end 45 to move out of contact with latch hanger 44, thereby causing screed blade 22 to drop into place. This operation is caused to occur by the escapement mechanism, shown generally at 48, located within carriage 28. Escapement mechanism 48 comprises a disc-like wheel 49 non-rotatably mounted to a shaft 50 extending transversely of carriage 28 between oppositely located wheels 30, such that shaft 59 is caused to rotate by the rotation of wheels 30 within tracks 32. A cam 51 is rotatably secured to the outermost surface of wheel 49 near its periphery such that the outer surface of cam 51 engages the forwardmost edge of elevating arm 46. An outwardly extending pin 52 is also secured to the outermost surface of wheel 49 to prevent free rotation of cam 51 when wheel 49 rotates in the direction associated with forward motion of carriage 28. Thus when carriage 28 is moving in the reverse direction, cam 51 will rotate freely, thereby exerting minimal force against the upper end of elevating arm 46 to retain screed blade 22 in the raised position. However, when carriage 28 begins travel in a forward direction, cam 51 rotates to the position shown in FIG. 5, where further rotation is restrained by pin 52, such that the outermost surface of cam 51 urges against the forwardmost edge of elevating arm 46, to cause arm 46 to pivot to the position shown in dashed lines in FIG. 5, thereby causing latch hanger 44 to be released and blade 22 to drop into the screeding position. As can be seen from the description hereinabove, the raising and lowering of screed blade 22 is entirely automatic.

In operation, filter tank 5 is filled to the desired level with the neutralized waste water from neutralizing tank 1, and the filtered water drains off through the permeable filter bed, leaving the cake-like sludge layer 21. When the supernatant water has drained off, the remaining sludge will exhibit cracks, indicating that the proper water content has been reached. Carriage 28 is then moved in the reverse direction to a desired location on the filter bed to begin the sludge removal operation. When carriage 28 is started in the forward direction, screed blade 22 drops into place, moving the sludge layer along filter bed 5 and upwardly along the inclined portion of the filter bed. It will be observed that the lower edge of screed blade 22 just contacts the upper surface of floor 16 of the inclined portion of filter tank 5 to prevent sludge from flowing under the edge of the blade back into the filter tank. Sludge movement continues until the sludge is discharged from discharge station 9 into hopper 10 or other receptacle. The direction of travel of carriage 28 is then reversed, automatically raising screed blade 22, and the process continued until the filter bed is cleaned of the sludge layer.

In some instances, it may be necessary to loosen the material comprising upper filter layer 19 by spading or tilling, which is easily accomplished as a result of the jagged surfaced composition of the particles. In addition, it may be desirable in some cases to remove a slight portion of the upper surface of filter layer 19 after a significant number of filtering operation. Filter layer 19 may be easily replaced by adding an additional quantity of jagged surfaced particles to filter tank 5 near charging station 8 and spreading the material along the surface of the filter bed by moving carriage 28 in the forward direction. In this way, the filter bed will last indefinitely.

It will be understood that various changes in the details, materials, steps and arrangments of parts, which have been herein described and illustrated in order to explain the nature of the invention, may be made by those skilled in the art within the principle and scope of the invention as expressed in the appended claims.

The embodiments of the invention in which an exclusive property or privilege is claimed are defined as follows:

1. A waste water filtration and sludge removal system for filtering and removing sludge materials suspended in water comprising:
   (a) A trough-like filtering tank having a pair of spaced upstanding longitudinal walls supported by a substantially planar imperforate floor, one end of said tank forming a charging station for introducing water containing sludge into said tank, the opposite end of said tank forming a discharge station for removing sludge from the tank;
   (b) A permeable filter bed overlying said floor for filtering the sludge from said water, the sludge being retained in a cake-like layer on the upper surface of said filter bed, said tank including means for recovering filtered water draining downwardly through said bed;
   (c) A screed blade mounted for reciprocating movement in directions parallel to said walls, the lower edge of said blade being positioned to just contact the upper surface of said filter bed for removing the sludge layer deposited thereon with minimal disturbance of said upper surface of said filter bed; and
   (d) Means for moving said screed blade in a forward direction toward said discharge station to move the sludge to the discharge station, and in a reverse direction away from said discharge station to return said blade for another scraping operation, said blade producing minimal disturbance of the sludge layer when moving in said reverse direction, said discharge station including an opening therein of sufficient dimensions to permit facile passage therethrough of sludge being discharged from said opening.

2. The system according to claim 1 wherein said filtered water recovering means comprises a plurality of spaced aperture-like weep holes extending through said walls adjacent said floor for draining filtered water from said filter bed, and a conduit communicating with said weep holes for conducting said filtered water away from said filter bed.

3. The system according to claim 1 wherein said filter bed comprises a layer of fine jagged surfaced particles overlying a layer of coarse particulate material, said jagged surfaces preventing close packing of said fine particles to insure relatively rapid flow of water filtered therethrough, said jagged surfaces operating to prevent the sludge penetrating therebetween.

4. The system according to claim 1 wherein said system includes latching means operating to position said screed blade to just contact the upper surface of said filter bed when said blade is moving in the forward direction and to raise said blade out of contact with said sludge layer when said blade is moving in said reverse direction.

5. The system according to claim 4 wherein said screed blade is mounted for pivotal movement toward said discharge station when said blade is moving in said reverse direction, said latching means including:

(a) A vertical elevating arm pivotally secured to the outermost edge of said blade, said arm being free to pivot independently of said blade when said blade is moving in said forward direction, but being adapted to cause said blade to pivot upwardly out of contact with the sludge layer when said blade is moving in the reverse direction;

(b) A rod-like trip pin extending horizontally outwardly from one of said walls and positioned to contact said elevating arm to cause said arm and said blade to pivot upwardly to a raised position when said blade is moving in said reverse direction;

(c) A hook-like latch hanger extending outwardly from the surface of said blade facing said discharge station;

(d) A latch arm extending downwardly pivotally mounted above and spaced from said blade, said latch arm being adapted to move longitudinally with said blade and having a latch hanger engaging latch positioned at the lowermost end of said latch arm for engaging said latch hanger to retain said blade in said raised position when said blade is pivoted upwardly to said raised position by said elevating arm; and (e) Escapement means connected to the upper end of said latch arm and responsive to movement of said blade in the forward direction, said escapement means operating to cause said latch of said latch arm to pivot away from said latch hanger when said blade begins movement in said forward direction to release said hanger from said latch, and permit said blade to pivot downwardly into contact with the sludge layer.

6. The system according to claim 1 wherein said tank floor slopes toward said recovering means.

7. The system according to claim 1 wherein said screed blade is adjustable vertically to permit the lower edge of said blade to contact the sludge layer or said permeable filter bed.

8. The system according to claim 1 wherein said system includes a channel-like track mounted on the upper edge of each of said walls, said moving means comprising:

(a) A carriage having a box-like frame and at least one wheel rotatably mounted to each end of said frame, said wheels being guided by said tracks to permit said carriage to move longitudinally along the upper edges of said walls;

(b) Means for suspending said screed blade from said carriage frame so that said blade is free to pivot toward said discharge station when said carriage is moving in said reverse direction, said screed blade being prevented from pivotal movement when said carriage is moving in said forward direction; and (c) Motor means for driving said carriage in said forward and reverse directions.

9. The system according to claim 1 wherein said discharge station includes a receptacle accepting bay, said bay being configured such that a receptacle may be positioned beneath said discharge station to receive the sludge discharged from said tank.

10. The system according to claim 1 wherein a portion of said tank slopes upwardly toward said discharge station such that the floor of said tank adjacent said discharge station is higher than the level of water containing sludge contained in said tank to prevent overflow from said discharge station.

11. A method for recovering sludge and fluid from waste water containing suspended sludge materials comprising:

(a) charging a filter tank with said waste water;

(b) Filtering said waste water through successive layers of particulate filter material to produce a layer of said sludge overlying said filter material, and to produce said fluid;

(c) Activating a screed blade to scrape said sludge layer from the upper surface of said filter material to a discharge station containing an opening of sufficient dimensions to permit facile passage of said sludge therethrough;

(d) Discharging said sludge from said opening;

(e) Reversing the direction of travel of said screed blade; and (f) Operating said blade to produce minimal disturbance of said sludge layer during said reverse travel of said blade.

12. The method according to claim 11 wherein said operating step includes raising said screed blade out of contact with said sludge layer.

13. The method according to claim 12 wherein said operating step is succeeded by the step of lowering said screed blade into contact with said sludge layer.

* * * * *

UNITED STATES PATENT AND TRADEMARK OFFICE
CERTIFICATE OF CORRECTION

PATENT NO. : 4,190,534
DATED : February 26, 1980
INVENTOR(S) : Everette LaVere Wyatt It is certified that error appears in the above—identified patent and that said Letters Patent is hereby corrected as shown below:

On the Title Page, the Assignee, should read -- Leggett & Platt, Inc., Carthage, Mo. --.

Signed and Sealed this

Tenth Day of June 1980

[SEAL]

Attest:

SIDNEY A. DIAMOND

Attesting Officer

Commissioner of Patents and Trademarks